United States Patent
Akie (10) Patent No.: US 7,231,036 B2
(45) Date of Patent: Jun. 12, 2007

(54) ANTI-HOWLING CIRCUIT DETECTING HOWLING FROM EFFECT OF PREDICTED ECHO SIGNAL

(75) Inventor: Kazuyoshi Akie, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 599 days.

(21) Appl. No.: 10/634,866

(22) Filed: Aug. 6, 2003

(65) Prior Publication Data
US 2004/0091099 A1    May 13, 2004

(30) Foreign Application Priority Data
Nov. 12, 2002    (JP) ............................. 2002-328137

(51) Int. Cl.
*H04M 1/00*    (2006.01)
(52) U.S. Cl. .......................... 379/406.05; 379/406.01; 379/406.04; 379/406.06; 379/406.08; 379/392.01
(58) Field of Classification Search ........... 379/406.01, 379/406.04, 406.05, 406.06, 406.08, 392.01
See application file for complete search history.

(56) References Cited

U.S. PATENT DOCUMENTS 5,668,794 A * 9/1997 McCaslin et al. ...... 379/406.07
6,097,971 A * 8/2000 Hosoi .................... 379/406.12
2004/0001450 A1 * 1/2004 He et al. ............... 379/406.08

FOREIGN PATENT DOCUMENTS

| JP | 62-051835 | 3/1987 |
| JP | 62-154824 | 7/1987 |
| JP | 09-116614 | 5/1997 |

OTHER PUBLICATIONS

Japanese Patent Office Action, dated Jul. 4, 2006 (with partial English-language translation).

* cited by examiner

*Primary Examiner*—Jefferey F. Harold
(74) *Attorney, Agent, or Firm*—Venable LLP; Michael A. Sartori; Catherine M. Voorhees (57) ABSTRACT

In a system in which echo transferred from a received signal to an outgoing signal is canceled by subtracting an adaptively predicted echo signal from the outgoing signal, howling is detected by detecting the effect of the predicted echo signal. The detected effect preferably depends on the magnitude or polarity of the predicted echo signal. The effect may be detected by comparing an envelope of the received signal or outgoing signal with a corresponding envelope of the residual outgoing signal left after echo cancellation. The echo attenuation on the echo path from the received signal to the outgoing signal may also be calculated, the conditions for howling detection being made more stringent as the detected echo attenuation increases. When howling is detected, it may be suppressed by attenuating the residual outgoing signal or initializing an adaptive filter that generates the predicted echo signal.

18 Claims, 6 Drawing Sheets

ANTI-HOWLING CIRCUIT DETECTING HOWLING FROM EFFECT OF PREDICTED ECHO SIGNAL

BACKGROUND OF THE INVENTION

1. Field of the Invention

The present invention relates to an anti-howling circuit useful for suppressing howling in a system including an adaptive echo canceler.

2. Description of the Related Art

Adaptive echo cancelers are widely used in telecommunication systems to cancel line echo and acoustic echo. Line echo is generated in the hybrid circuits that interface between two-wire and four-wire signal channels; acoustic echo is generated when the acoustic signal from a loudspeaker is picked up by a microphone. An adaptive echo canceler is a computing device based on an adaptive filter. Adaptive echo cancelers may be installed in telephone sets or telephone switching apparatus.

Adaptive echo cancelers are not always able to follow the rapid changes in the echo path that occur when a call is transferred from one extension line to another, or when a telephone is used in the hands-free mode. Uncanceled or incorrectly canceled echo may then circulate through the telephone network, building up into a howling tone. To prevent this, echo cancelers also detect and suppress howling. In a conventional howling detector of the type described in, for example, Japanese Unexamined Patent Application Publication No. 06-044724, howling is detected on the basis of the concentration of the energy of the microphone signal into a narrow signal band.

A problem with this detection system is that such concentration of signal energy does not always imply howling. Occasionally the energy of a natural speech signal is likewise concentrated into a narrow band. If a howling suppressor reduces the gain in, for example, the automatic gain control system of a loudspeaker amplifier on the basis of howling detection by this method, although howling is suppressed, desired speech is also sometimes suppressed, degrading the quality of the speech signal.

SUMMARY OF THE INVENTION

An object of the present invention is to improve the reliability of howling detection and the quality of speech transmission.

The invention provides a method of detecting howling in an environment having a first transducer for converting a received signal to acoustic output, a second transducer for converting acoustic input to an outgoing signal, and an adaptive echo canceler for generating a predicted echo signal from the received signal by multiplying samples of the received signal by respective tap coefficients, subtracting the predicted echo signal from the outgoing signal to generate a residual signal, and adaptively updating the tap coefficients. The invented method includes detecting an effect of the predicted echo signal.

The detected effect of the predicted echo signal preferably depends on the magnitude and polarity of the predicted echo signal.

The effect of the predicted echo signal may be detected by detecting a first envelope of the outgoing signal, detecting a second envelope of the residual signal, and comparing the first envelope with the second envelope.

Alternatively, the effect of the predicted echo signal may be detected by detecting a first envelope of the received signal, detecting a second envelope of the residual signal, and comparing the first envelope with the second envelope.

The method may further include detecting the echo attenuation on the echo path from the received signal to the outgoing signal, and altering the condition for detection of howling according to the detected echo attenuation, the condition becoming more stringent as the detected echo attenuation increases.

The invention also provides an anti-howling circuit that employs the invented method of detecting howling. The anti-howling circuit may include an attenuating circuit for attenuating the residual signal when howling is detected, or an initializing circuit for initializing the tap coefficients of the adaptive echo canceler when howling is detected.

DETAILED DESCRIPTION OF THE INVENTION

Six embodiments of the invention will now be described with reference to the attached drawings, in which like elements are indicated by like reference characters.

A common feature of the six embodiments is that they compare the signal power envelope at two points in an adaptive echo canceler. This enables them to detect howling more accurately than previously and improve the quality of the speech signal by suppressing the howling promptly. The howling detection errors that occur in the prior art are avoided because the howling detection process does not take concentration of signal energy into a narrow signal band into consideration.

FIRST EMBODIMENT

Figure 1:
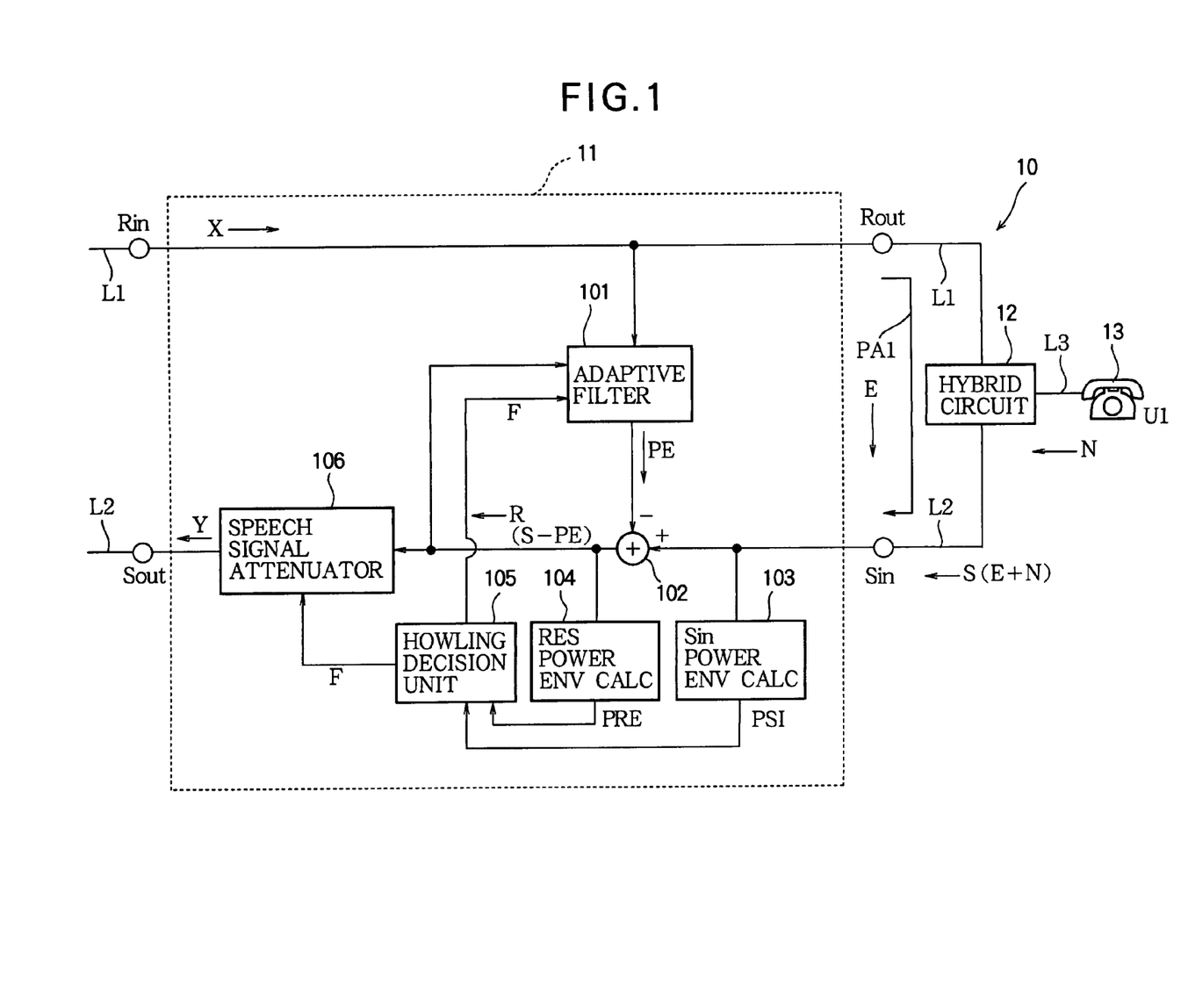
FIG. 1 is a block diagram of an echo canceler incorporating an anti-howling circuit according to a first embodiment of the invention.

Referring to FIG. 1, the first embodiment 10 includes an echo canceler 11, signal transmission lines L1, L2, and L3, a hybrid circuit 12, and a telephone set 13. The echo canceler 11 is digital and the hybrid circuit 12 is analog; digital-to-analog and analog-to-digital converters are therefore present, but they have been omitted to simplify the drawings.

The echo canceler 11 comprises a receiving input terminal Rin and a receiving output terminal Rout connected to line L1, a sending input terminal Sin and a sending output terminal Sout connected to line L2, a subtractor 102, an adaptive filter 101, a speech input power envelope calculation unit (Sin POWER ENV CALC) 103, a residual power envelope calculation unit (RES POWER ENV CALC) 104, a howling decision unit 105, and a speech signal attenuator 106.

Line L1 is a two-wire signal channel for transmission of a speech signal X from a far-end party (not shown) to the hybrid circuit 12; line L2 is a two-wire signal channel for transmission of a speech signal Y (originally S) from the hybrid circuit 12 to the far-end party. Together, lines L1 and L2 form a four-wire signal channel. The reason for using a four-wire channel is that lines L1 and L2 are generally long-haul lines, and amplifiers (not shown) are necessary to compensate for transmission loss in the speech signals X and Y. To accommodate the amplifiers, a separate two-wire signal channel is necessary for each direction.

Line L3 carries speech signals in both directions between the hybrid circuit 12 and the telephone set 13. Since line L3 is far shorter than lines L1 and L2, amplification is unnecessary, and a two-wire signal channel suffices.

The hybrid circuit 12 includes a hybrid coil that interfaces between lines L1 and L2 and line L3, converting between the four-wire and two-wire signal transmission systems. Although the hybrid coil is designed for matched impedance, because of variations in the material and length of line L3, perfect impedance matching is difficult to achieve. Due to impedance mismatch, the received speech signal X is transmitted not only to line L3, as desired, but also to line L2, as not desired, giving rise to a line echo E. The path PA1 that allows transmission from line L1 to line L2 is referred to as an echo path.

Echo does not arise only from impedance mismatch in the hybrid circuit 12. If the telephone set 13 outputs the received speech signal X from a first transducer such as a loudspeaker for use in a hands-free teleconferencing system, the output acoustic signal may become mixed with the outgoing speech signal N in a second transducer or microphone in the telephone set 13, thereby creating an acoustic echo. Acoustic echo and line echo both appear alike to the echo canceler 11, so path PA1 includes both the acoustic echo path and the line echo path.

The speech signal X transmitted from the far-end party on line L1 is received at input terminal Rin of the echo canceler 11, is output from output terminal Rout of the echo canceler 11, and passes through the hybrid circuit 12 to the telephone set 13. The speech signal N from the telephone set 13 is routed through the hybrid circuit 12 to input terminal Sin of the echo canceler 11 (becoming an input speech signal S), passes through the echo canceler 11 (becoming a residual signal R, then an outgoing speech signal Y), and is transmitted from output terminal Sout of the echo canceler 11 back to the far-end party on line L2.

The near-end speech signal S input to the echo canceler 11 includes both the speech signal N of the telephone user U1 (the near-end party) and the echo signal E. The echo signal E includes line echo due to impedance mismatch in the hybrid circuit 12, and may also include acoustic echo, as noted above.

The adaptive filter 101 includes a transversal filter with tap coefficients that are adaptively updated on the basis of the received speech signal X and residual signal R. The tap coefficients model the impulse response of the echo path PA1, which is unknown beforehand, enabling the adaptive filter 101 to generate a predicted echo signal PE by multiplying samples of the received speech signal X by the tap coefficients and summing the products. The tap coefficients may be updated by a variety of well-known mathematical algorithms, such as the normalized least mean squares (NLMS) algorithm or the least mean squares (LMS) algorithm, for example.

The subtractor 102 subtracts the predicted echo signal PE output from the adaptive filter 101 from the speech signal S received at input terminal Sin, and outputs the result as the residual signal R. Ideally, the adaptive filter 101 predicts the echo signal E accurately, the echo signal E in the speech signal S and the predicted echo signal PE exactly cancel out, and the residual signal R matches the speech signal N, but in practice the prediction is inaccurate, the cancellation is inexact, and some echo remains in the residual signal R. The adaptive filter 101 adaptively updates its coefficients to minimize the prediction error, thereby minimizing the residual echo.

The speech input power envelope calculation unit 103 calculates the power envelope PSI of the speech signal S input from input terminal Sin of the echo canceler 11 by a multiply-and-accumulate operation given by the equation (1) below. The value of the calculated power envelope PSI is supplied to the howling decision unit 105.

$$PSI = \sum_{i=0}^{M-1} S_{(i)}^2 \quad (1)$$

In equation (1), i indicates the sample number and M is an arbitrary number of samples, equal to or greater than one.

Although the power information calculated in equation (1) corresponds to the square of the amplitude of the speech signal, the calculated information does not necessarily have to be a power value. The energy of the speech signal can also be expressed by its amplitude, so the calculated information may be based on amplitude instead of power.

The reason for detecting the power envelope is to obtain a stable detection result despite such speech signal properties as an amplitude that varies frequently and rapidly in a complicated pattern over a wide range. Calculated information other than the power envelope may be used if it also provides stable detection of speech signal properties. For example, speech signal properties can be detected in a stable manner by taking the sum of the absolute values of the amplitude of the speech signal (S) over an arbitrary number (M) of samples as in the formula (2) below, in which i again indicates the sample number.

$$\sum_{i=0}^{M-1} |S_{(i)}| \quad (2)$$

The power envelope given by equation (1), however, is used in the speech input power envelope calculation unit 103 and the residual power envelope calculation unit 104 in the present embodiment.

Regarding the number of samples M in equations (1) and (2), the smaller M is, the more quickly howling can be detected, but the frequency of mistaken detection rises and the reliability of the detection result decreases; the larger M is, the more difficult it becomes to detect howling quickly, but detection mistakes become less frequent and the reliability of the detection is improved. If an appropriate value M is selected, howling can be detected before the near-end party (user U1) becomes aware of it (or while the near-end party is still only scarcely aware of it) and high detection reliability can be maintained. For the standard telecommunication sampling rate, M may be set to about 80, for example.

The residual power envelope calculation unit 104 calculates the power envelope PRE of the residual signal R output from the subtractor 102 by the equation (3) below, in which i and M have the same meanings as in equation (1). The calculated power envelope PRE is supplied to the howling decision unit 105. The residual power envelope calculation unit 104 calculates the power envelope by the same multiply-and-accumulate operation as performed in the speech input power envelope calculation unit 103, using the residual signal R instead of the speech signal S.

$$PRE = \sum_{i=0}^{M-1} R_{(i)}^2 \qquad (3)$$

The howling decision unit 105 receives the power envelope PRE from the residual power envelope calculation unit 104 and the power envelope PSI from the speech input power envelope calculation unit 103, determines whether howling is present from the equations below, and outputs a howling flag signal F indicating the result.

$$\delta \text{ [dB]} < 10 \cdot \log_{10} \frac{PRE}{PSI} \text{ [dB]} \qquad (4)$$

$$\delta \text{ [dB]} \geq 10 \cdot \log_{10} \frac{PRE}{PSI} \text{ [dB]} \qquad (5)$$

The parameter $\delta$ in conditions (4) and (5) provides a tolerance range for adaptation errors that may occur briefly in the echo canceler 11 due to changes in the conversation mode (single-talk, double-talk, etc.). The value of $\delta$ is set in the design stage of the echo canceler. In the present embodiment, $\delta$ is equal to 1.0 dB, but $\delta$ is not limited to this value. The howling decision unit 105 sets the howling flag F to indicate the howling state when condition (4) is true, and clears the howling flag F to indicate the normal state (without howling) when condition (5) is true.

One reason why howling may occur in the circuit structure in FIG. 1 is as follows.

In the normal state, the subtractor 102 reduces the amplitude of the echo component, so the amplitude of the residual signal R is less than the amplitude of the speech signal S. If the echo path changes faster than the adaptive filter 101 can adapt, however, a type of oscillation may take place in which the tap coefficients are updated to the maximum limit and an abnormal predicted echo signal PE is output, with a (positive or negative) polarity opposite to the polarity of the input speech signal S. The amplitude of the residual signal R then becomes greater than the amplitude of the speech signal S, causing the adaptive filter 101 and the subtractor 102 to operate as a (virtual) amplifier. If the amplification factor is sufficiently large, howling occurs.

Although howling may also be caused by, for example, the above-mentioned amplifiers (not shown) on lines L1 and L2, even without these amplifiers, howling may occur when the adaptive filter 101 and subtractor 102 operate as a virtual amplifier as described above. During this type of howling, power envelope PRE is greater than power envelope PSI. The value on the right side of the inequality sign in condition (4) is 1.0 when the value of PRE/PSI is about 1.3. If the value of PRE increases further, condition (4) becomes true.

The speech signal attenuator 106 receives the howling flag signal F output from the howling decision unit 105. When the howling flag signal F indicates the howling state (when it is set to '1', for example), the speech signal attenuator 106 attenuates the amplitude of the residual signal R; when the howling flag signal F indicates the normal howling-free state (when it is cleared to '0', for example), the speech signal attenuator 106 passes the residual signal R without attenuating its amplitude. The residual signal R attenuated or passed by the speech signal attenuator 106 becomes the speech signal Y which is sent from output terminal Sout onto line L2.

The structure of the first embodiment having been described above, its operation will be described below. The telephone set 13 and/or the telephone set of the far-end party are assumed to be used in a hands-free system, or in a system in which a call is transferred from one extension line to another. If the telephone set 13 is used in a hands-free system, the telephone set 13 has a loudspeaker that outputs an acoustic signal into the surrounding space.

When the user U1 of the telephone set 13 converses with the far-end party, a speech signal X is transmitted on line L1, routed through the hybrid circuit 12, and transmitted to the user U1 of the telephone set 13 on line L3 in FIG. 1. The speech signal N of user U1 is transmitted on line L3, routed through the hybrid circuit 12, and transmitted back to the far-end party on line L2.

In the howling-free state, the predicted echo signal PE has a normal size and polarity, as described above, so the amplitude of the residual signal R is less than the amplitude of the speech signal S. Accordingly, the power envelope PSI output from the speech input power envelope calculation unit 103 is greater than the power envelope PRE output from the residual power envelope calculation unit 104, and the value of PRE/PSI is less than one. The value on the right side of the inequality sign in condition (4) is therefore negative (−0.5 dB, for example), so condition (4) is false and condition (5) is true, and the howling decision unit 105 outputs a howling flag signal F indicating the normal state. The speech signal attenuator 106 therefore does not attenuate the residual signal R received from the subtractor 102 but outputs the residual signal R as the speech signal Y from output terminal Sout onto line L2.

The adaptive filter 101 normally updates its tap coefficients at a comparatively gradual rate on the basis of the residual signal R and the speech signal X, and outputs a predicted echo signal PE that is closely adapted to the varying impulse response of the echo path PA1, permitting the conversation to take place with high speech signal quality.

In the hands-free mode, however, the impulse response of the echo path PA1 may undergo a rapid change that causes the adaptive filter 101 to begin updating its tap coefficients to the maximum limit and outputting an abnormal predicted echo signal PE with a polarity opposite to the polarity of the original speech signal S, so that the amplitude of the residual signal R exceeds the amplitude of the speech signal S. If the amplitude of the residual signal R is increased so much that the value on the right side of the inequality sign in condition (4) exceeds the parameter $\delta$ (1.0), the howling decision unit 105 sets the howling flag F to indicate the howling state, the speech signal attenuator 106 attenuates the amplitude of the residual signal R, and the attenuated signal is output as the speech signal Y. The speech signal attenuator 106 continues to attenuate the amplitude of the residual signal R, thereby suppressing howling, until the echo path PA1 has stabilized sufficiently for the adaptive filter 101 to adapt its tap coefficients to values that do not result in the output of an abnormal predicted echo signal PE: more precisely, to values that do not result in condition (4) above.

Attenuation by the speech signal attenuator 106 can be regarded as canceling the amplification by the virtual amplifier described above. If the overall gain is equal to or less than unity, howling does not occur.

The amount of amplitude attenuation performed in the howling state does not have to eliminate howling completely. If necessary, an unobtrusive amount of howling may be permitted to remain.

The first embodiment 10 detects howling more accurately than previously, and suppresses howling quickly, thereby improving the quality of the speech signal. Howling detection accuracy is improved in that the howling detection process does not take concentration of signal energy into a narrow signal band into consideration, thereby avoiding the howling detection errors that occur in the prior art.

SECOND EMBODIMENT

Figure 2:
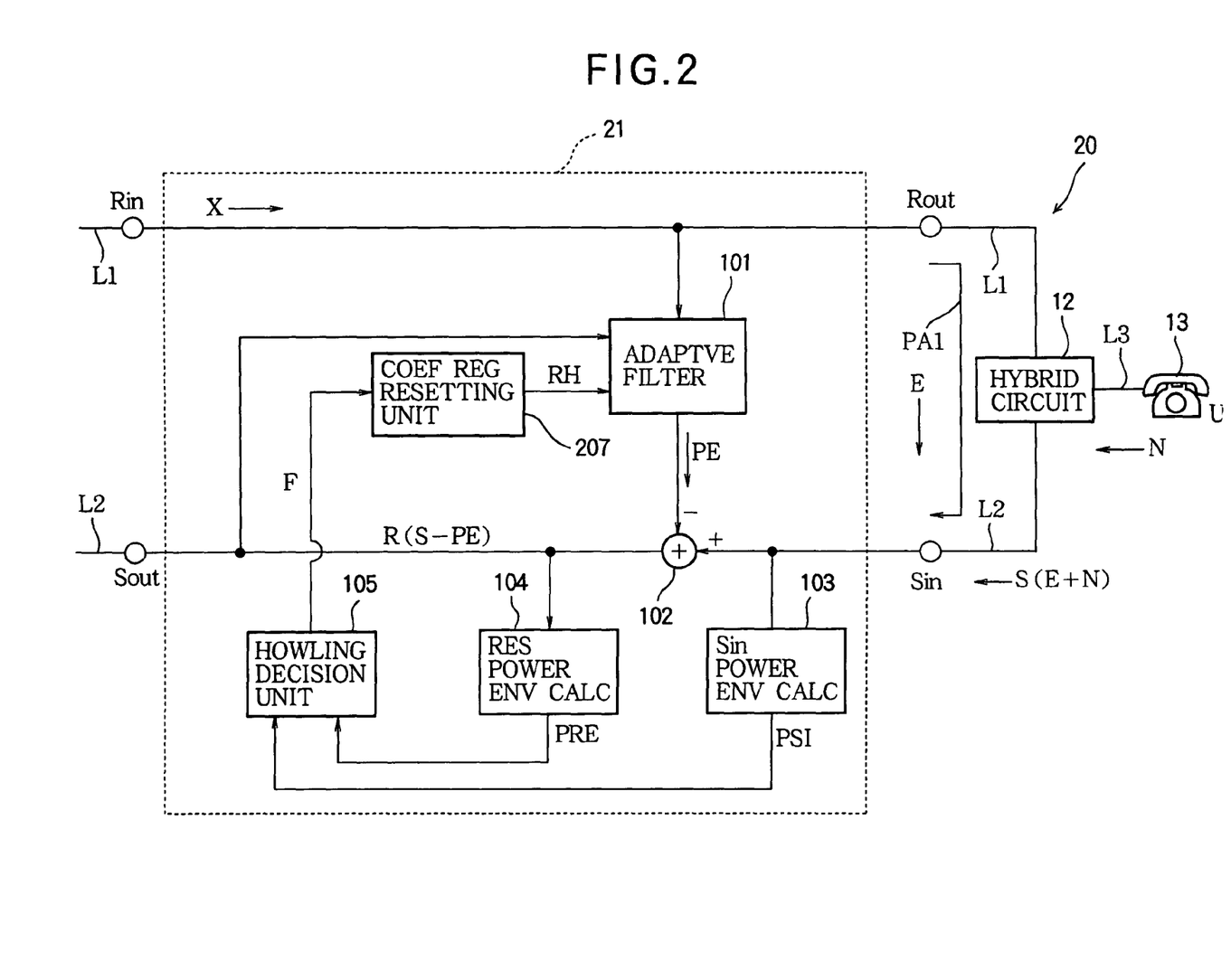
FIG. 2 is a block diagram of an echo canceler incorporating an anti-howling circuit according to a second embodiment of the invention.

The second embodiment differs from the first embodiment in regard to the operation after the howling state is detected. The difference from the first embodiment will be described below.

Referring to FIG. 2, the second embodiment 20 includes an echo canceler 21, signal transmission lines L1, L2, and L3, a hybrid circuit 12, and a telephone set 13. The echo canceler 21 differs from the echo canceler 11 in the first embodiment by replacing the speech signal attenuator with a coefficient register (COEF REG) resetting unit 207.

The coefficient register resetting unit 207 operates only when the howling flag signal F supplied from the howling decision unit 105 indicates the howling state. When the howling flag signal F indicates the howling state, the coefficient register resetting unit 207 supplies a reset register signal RH to the adaptive filter 101. The adaptive filter 101 responds by overwriting the data in its tap coefficient registers with initial values ('0', for example) This overwriting is performed with higher priority than the normal updating of the tap coefficients on the basis of the residual signal R and the speech signal X.

When the values of the tap coefficients are reset in this way, the adaptive filter 101 does not output an abnormal predicted echo signal PE of the type described above, so the howling caused by the abnormal predicted echo signal PE is directly and forcefully suppressed.

The second embodiment provides substantially the same effects as seen in the first embodiment, but in the second embodiment, when the coefficient registers are initialized, the adaptive filter 101 returns to a normal state immediately, thereby suppressing howling more quickly than in the first embodiment.

THIRD EMBODIMENT

Figure 3:
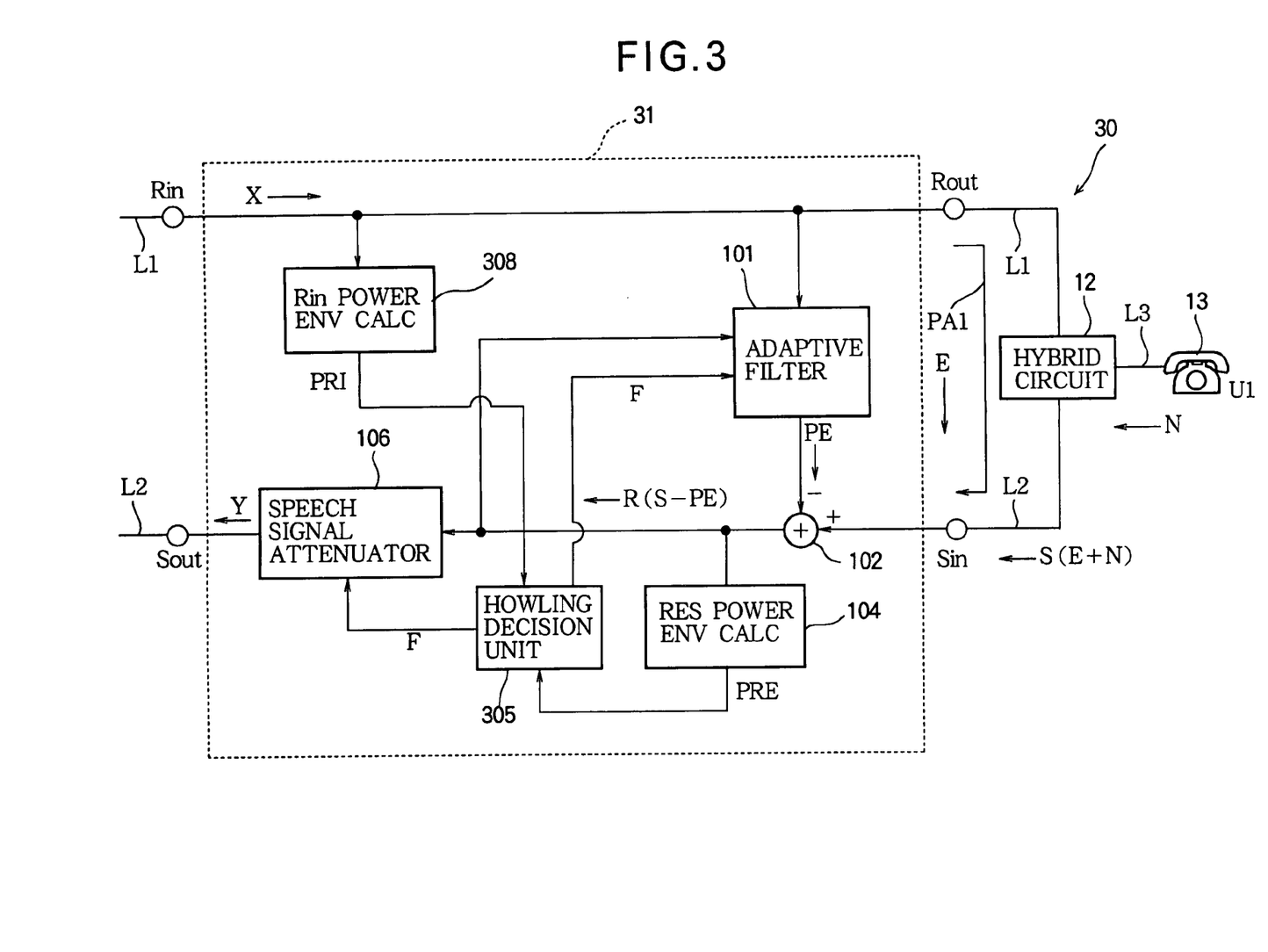
FIG. 3 is a block diagram of an echo canceler incorporating an anti-howling circuit according to a third embodiment of the invention.

The third embodiment differs from the first embodiment by using the power envelope of the speech signal X instead of the speech signal S. The difference from the first embodiment will be described below.

In the design stage of the echo canceler, the echo attenuation, which is the sum of the loss on the echo path and the amount of the echo cancellation by the echo canceler, must be often set at a desired value. This is taken into account in the third embodiment.

Referring to FIG. 3, the third embodiment 30 includes an echo canceler 31, signal transmission lines L1, L2, and L3, a hybrid circuit 12, and a telephone set 13. The echo canceler 31 differs from the echo canceler 11 in the first embodiment by replacing the speech input power envelope calculation unit 103 and the howling decision unit 105 with a received input power envelope calculation unit 308 and a howling decision unit 305.

The received input power envelope calculation unit 308 calculates a power envelope PRI on the basis of the speech signal X, and supplies the power envelope PRI to the howling decision unit 305.

Although the howling decision unit 305 has the same basic function as the howling decision unit 105 in the first embodiment, the howling decision unit 305 receives the power envelope PRI instead of the power envelope PSI, so the howling decision unit 305 can operate effectively when the near-end speech signal N is silent and the echo canceler 31 receives only the far-end speech signal X.

The characteristics of the echo path PA1 at the current point in time are not incorporated into the power envelope PRI obtained from input terminal Rin, but these characteristics are incorporated together with the predicted echo signal PE into the residual signal R, so the howling decision unit 305 can recognize the howling state on the basis of the difference from the echo attenuation target set in the design stage.

Since the howling decision unit 305 uses the power envelope PRI instead of the power envelope PSI, conditions (7) and (8), in which PSI in the denominator of the logarithm expression in conditions (4) and (5) is replaced with PRI, are used to distinguish between the howling state and the normal state.

$$PRI = \sum_{i=0}^{M-1} X_{(i)}^2 \quad (6)$$

$$\delta \; [dB] < 10 \cdot \log_{10} \frac{PRE}{PRI} \; [dB] \quad (7)$$

$$\delta \; [dB] \geq 10 \cdot \log_{10} \frac{PRE}{PRI} \; [dB] \quad (8)$$

Condition (7) corresponds to condition (4); condition (8) corresponds to condition (5). As in the first embodiment, the parameter δ may have a value of 1.0, but is not limited to this value. The power envelope PRI is obtained by the multiply-and-accumulate operation given by equation (6).

The third embodiment provides substantially the same effects as seen in the first embodiment. Since the third embodiment enables the echo attenuation to be set at a desired value in the design stage of the echo canceler, however, the design process is facilitated and the reliability of the anti-howling function is improved, because it more faithfully follows the designer's intention.

FOURTH EMBODIMENT

Figure 4:
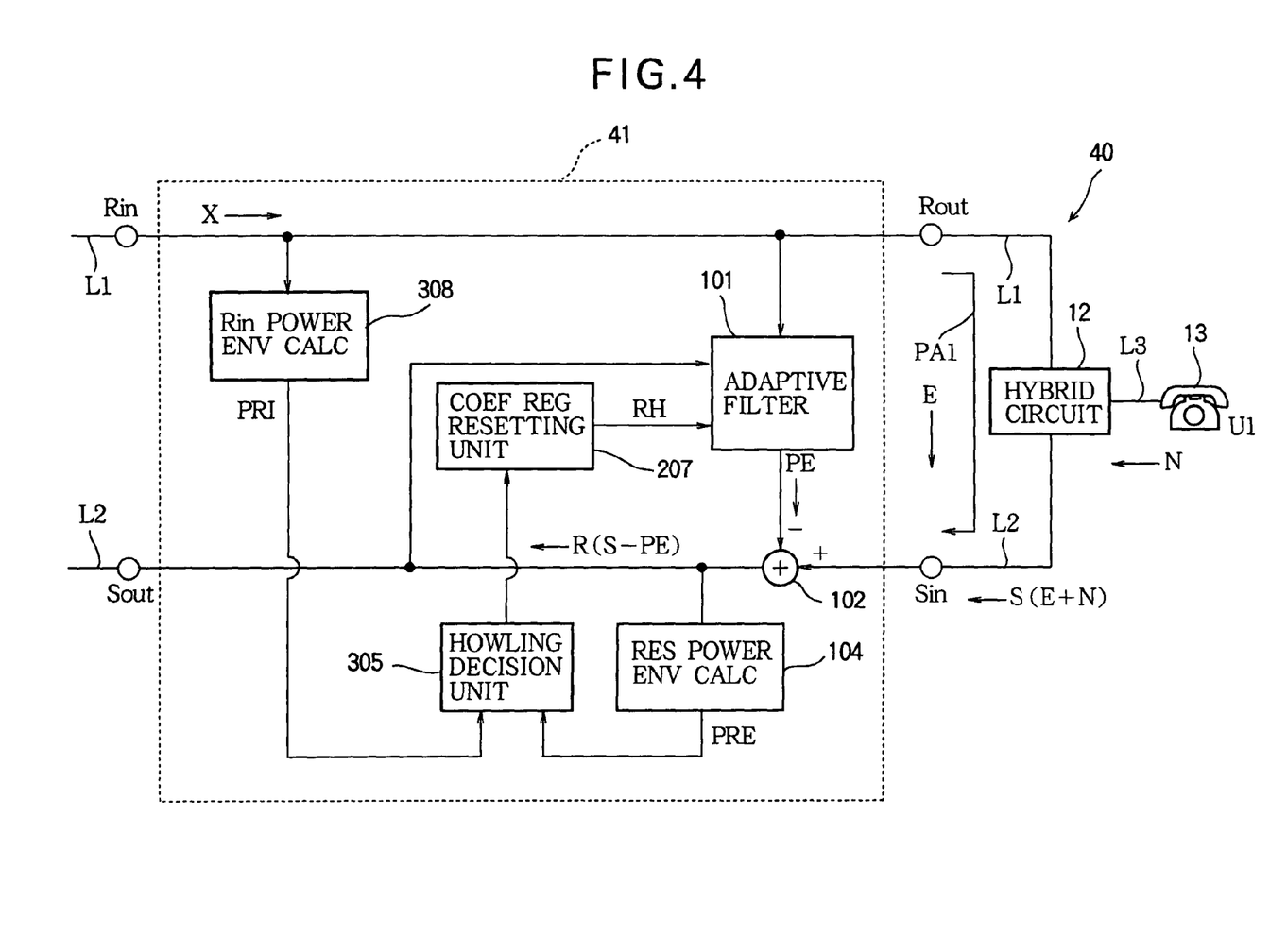
FIG. 4 is a block diagram of an echo canceler incorporating an anti-howling circuit according to a fourth embodiment of the invention.

The fourth embodiment differs from the third embodiment by replacing the speech signal attenuator with the coefficient register resetting unit of the second embodiment. The resulting differences from the third embodiment will be described below.

Referring to FIG. 4, the fourth embodiment 40 includes an echo canceler 41, signal transmission lines L1, L2, and L3, a hybrid circuit 12, and a telephone set 13. The echo canceler 41 is identical to the echo canceler 31 in the third embodiment except for the replacement of the speech signal attenuator 106 by the coefficient register resetting unit 207 that resets the values of the tap coefficients in the howling state. When the values of the tap coefficients are reset, the adaptive filter 101 immediately halts output of an abnormal predicted echo signal PE of the type that increases the amplitude of the residual signal R.

The fourth embodiment provides the combined effects of the second and third embodiments, including enhanced reliability, simplified design, and quick, direct suppression of howling.

FIFTH EMBODIMENT

Figure 5:
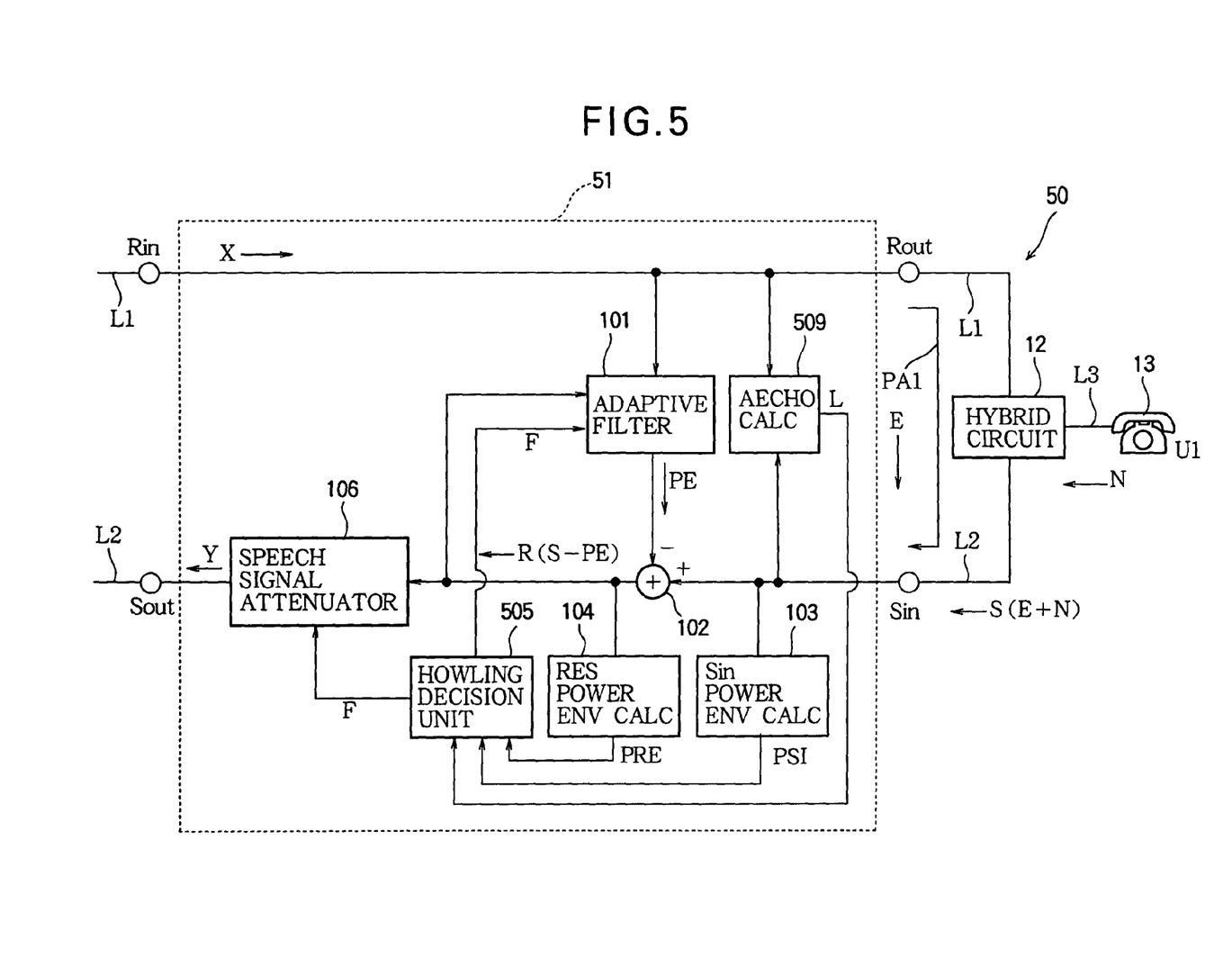
FIG. 5 is a block diagram of an echo canceler incorporating an anti-howling circuit according to a fifth embodiment of the invention.

Referring to FIG. 5, the fifth embodiment 50 includes an echo canceler 51, signal transmission lines L1, L2, and L3, a hybrid circuit 12, and a telephone set 13. The echo canceler 51 differs from the echo canceler 11 in the first embodiment by including an echo loss calculation unit (AECHO CALC) 509 and replacing the howling decision unit 105 with a different howling decision unit 505.

The echo loss calculation unit 509 uses a known method to calculate the loss L in decibels (dB) on the echo path, on the basis of the speech signals X and S, thus determining the echo attenuation (AECHO). The calculated echo loss L is supplied to the howling decision unit 505.

Although the howling decision unit 505 has the same basic function as the howling decision unit 105 in the first embodiment, the howling decision unit 505 differs from the howling decision unit 105 by incorporating the echo loss L into its decision criteria, which are now given by conditions (9) and (10) below.

$$\delta \ [dB] < 10 \cdot \log_{10} \frac{PRE}{PSI} - L \ [dB] \quad (9)$$

$$\delta \ [dB] \geq 10 \cdot \log_{10} \frac{PRE}{PSI} - L \ [dB] \quad (10)$$

Condition (9) corresponds to condition (4) in the first embodiment; condition (10) corresponds to condition (5). The parameter $\delta$ may be set to a suitable value, taking the design value of the echo pass loss L into consideration.

As is evident from conditions (9) and (10), the echo loss L is incorporated into the decision criteria in such a way that the larger the echo loss L becomes, the less frequently howling is detected and the more frequently the decision result indicates the normal state. That is, the larger the echo loss L becomes, the more stringent the condition (9) for howling detection becomes.

When the echo loss L is comparatively large, the amplitude of the echo signal E transmitted from line L1 through the hybrid circuit 12 to line L2 is comparatively small. Accordingly, if the echo loss L is comparatively large, howling occurs relatively infrequently. If the howling state is recognized solely on the basis of the ratio of the power envelopes PRE and PSI as in the first embodiment, howling may be recognized even when the loss on the echo path PA1 is so large that howling does not actually occur. Incorporating the echo loss L into the decision criteria therefore improves the reliability of the decision result.

Since attenuation of the amplitude of the speech signal or initialization of the tap coefficients when the howling state is recognized degrades the quality of the speech signal for at least a brief interval, an increase in the reliability of the decision result and a decrease in the frequency of mistaken howling detection contributes to improved speech signal quality.

The fifth embodiment thus provides substantially the same effects as seen in the first embodiment, but with improved speech signal quality, since the reliability of howling detection is improved. Since the fifth embodiment detects the howling state on the basis of both echo path loss and the further loss or gain caused by subtraction of the predicted echo signal PE, total echo attenuation is taken into consideration, as in the third embodiment, and the howling decision can be made quickly, according to the intended total echo attenuation value.

SIXTH EMBODIMENT

Figure 6:
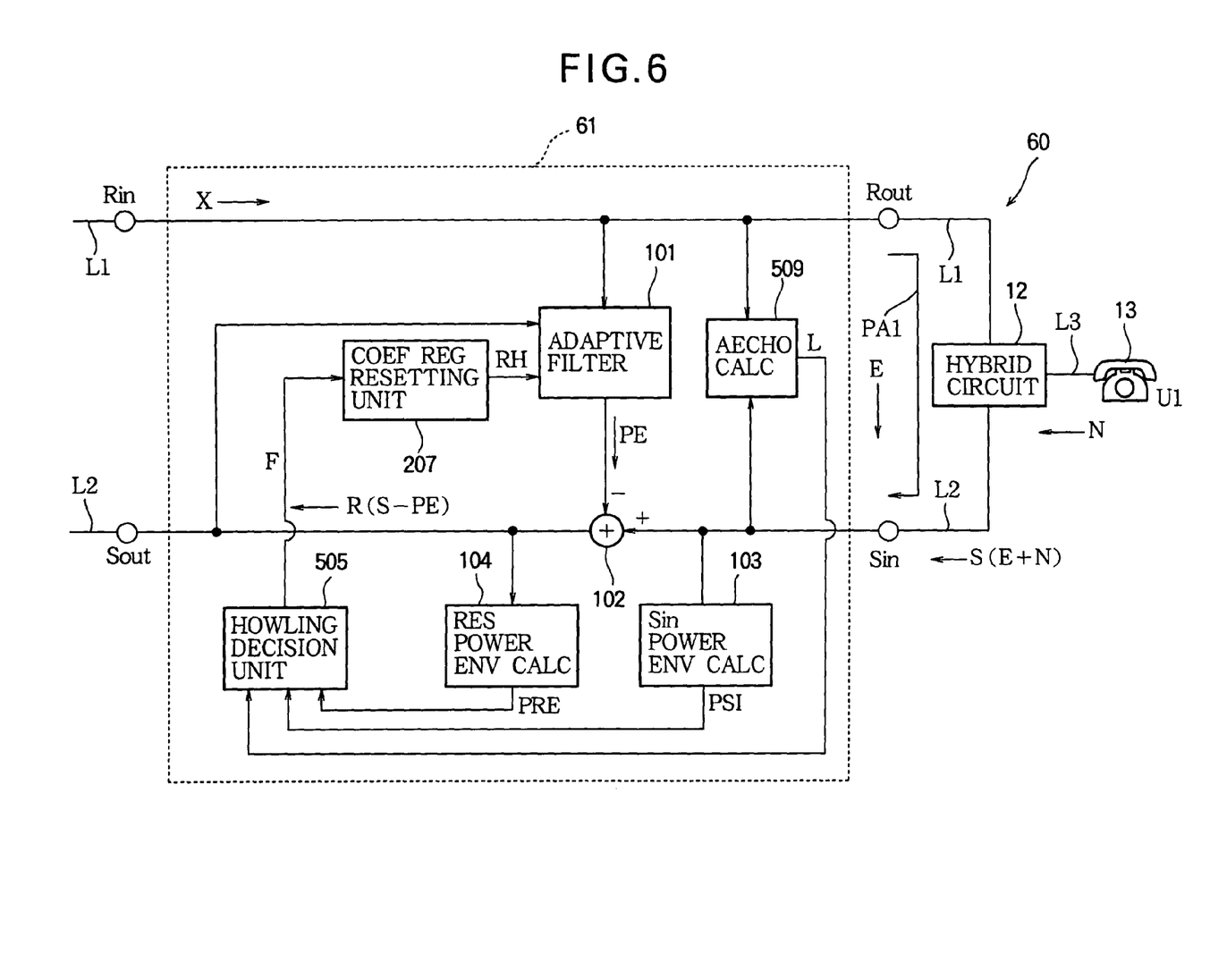
FIG. 6 is a block diagram of an echo canceler incorporating an anti-howling circuit according to a sixth embodiment of the invention.

The sixth embodiment differs from the fifth embodiment by replacing the speech signal attenuator with the coefficient register resetting unit of the second embodiment. The differences from the fifth embodiment will be described below.

Referring to FIG. 6, the sixth embodiment 60 includes an echo canceler 61, signal transmission lines L1, L2, and L3, a hybrid circuit 12, and a telephone set 13. The echo canceler 61 is identical to the echo canceler 51 in the fifth embodiment, except for the replacement of the speech signal attenuator 106 by the coefficient register resetting unit 207.

In the sixth embodiment, when the howling flag signal F indicates the howling state, the coefficient register resetting unit 207 supplies a reset register signal RH to the adaptive filter 101. The adaptive filter 101 responds by overwriting the data in its tap coefficient registers with initial values ('0', for example). When the values of the tap coefficients are thus initialized, the adaptive filter 101 does not output an abnormal predicted echo signal PE of the type described above, so the howling caused by the abnormal predicted echo signal PE is directly and forcefully suppressed.

The sixth embodiment provides the combined effects of the second and fifth embodiments, including enhanced reliability, simplified design, and quick, direct suppression of howling.

Since the embodiments described above are not necessarily incompatible with the prior art in which howling is detected on the basis of the concentration of signal energy into a narrow band, a single anti-howling device may include both elements of the embodiments described above and elements of the prior art.

For example, howling may be suppressed (by amplitude attenuation or resetting of tap coefficients) only when concentration of signal energy is detected and the control unit in one of the embodiments described above (the howling decision unit 105, for example) simultaneously recognizes the howling state.

When the howling state is recognized, the amplitude of the speech signal X or the predicted echo signal PE, instead of the amplitude of the residual signal R, may attenuated to suppress howling.

Although conditions including logarithm expressions are used to recognize the howling state in the embodiments described above, these conditions may be changed to conditions that do not include logarithm expressions with almost no change in mathematical meaning. Condition (4), for example, may be changed to a logarithm-free condition in which the howling state is recognized when the ratio PRE/PSI exceeds a predetermined threshold value. Alternatively, the howling state may be recognized when the difference between PRE and PSI (or their decibel values) exceeds a predetermined threshold value.

As noted above, the absolute value of the amplitude may be used instead of the power envelopes PRE and PSI.

Although the echo cancelers in the embodiments described above both recognize and suppress howling (by amplitude attenuation or resetting of tap coefficients), the echo cancelers do not have to perform both of these functions. The design of the echo canceler can be changed in such a way that one anti-howling device recognizes the howling state and another anti-howling device suppresses howling on the basis of the decision result. An anti-howling device that recognizes the howling state but does not suppress howling also has high utility.

The present invention can be usefully applied even when there is no hybrid circuit 12, as another line echo path may be present.

The invention may also be applied to acoustic echo cancelers, as noted above.

The invention as a whole is realized in hardware in the preceding description, but the invention can also be practiced in software.

Those skilled in the art will recognize that further variations are possible within the scope of the invention, which is defined by the appended claims.

What is claimed is:

1. An anti-howling circuit for use in an environment having a first transducer for converting a received signal to acoustic output, a second transducer for converting acoustic input to an outgoing signal, and an adaptive echo canceler for generating a predicted echo signal from the received signal by multiplying samples of the received signal by respective tap coefficients, subtracting the predicted echo signal from the outgoing signal to generate a residual signal, and adaptively updating the tap coefficients, comprising:
   a first envelope detector for detecting a first envelope of the outgoing signal;
   a second envelope detector for detecting a second envelope of the residual signal;
   an echo loss calculator for calculating echo attenuation on an echo path from the received signal to the outgoing signal: and
   a decision circuit for comparing the first envelope with the second envelope, thereby detecting howling, wherein the decision unit detects howling when the second envelope exceeds the first envelope by a threshold ratio that depends on the calculated echo attenuation on the echo path.

2. The anti-howling circuit of claim 1, further comprising an attenuating circuit for attenuating the residual signal when howling is detected.

3. The anti-howling circuit of claim 1, further comprising an initializing circuit for initializing the tap coefficients when howling is detected.

4. The anti-howling circuit of claim 1, wherein the threshold ratio increases as the calculated echo attenuation increases.

5. An anti-howling circuit for use in an environment having a first transducer for converting a received signal to acoustic output, a second transducer for converting acoustic input to an outgoing signal, and an adaptive echo canceler for generating a predicted echo signal from the received signal by multiplying samples of the received signal by respective tap coefficients, subtracting the predicted echo signal from the outgoing signal to generate a residual signal, and adaptively updating the tap coefficients, comprising:
   a first envelope detector for detecting a first envelope of the received signal;
   a second envelope detector for detecting a second envelope of the residual signal; and
   a decision circuit for comparing the first envelope with the second envelope, thereby detecting howling.

6. The anti-howling circuit of claim 5, wherein the first envelope and the second envelope are power envelopes.

7. The anti-howling circuit of claim 5, wherein the decision unit detects howling when the second envelope exceeds the first envelope by at least a predetermined ratio.

8. The anti-howling circuit of claim 5, further comprising an attenuating circuit for attenuating the residual signal when howling is detected.

9. The anti-howling circuit of claim 5, further comprising an initializing circuit for initializing the tap coefficients when howling is detected.

10. A method of detecting howling in an environment having a first transducer for converting a received signal to acoustic output, a second transducer for converting acoustic input to an outgoing signal, and an adaptive echo canceler for generating a predicted echo signal from the received signal by multiplying samples of the received signal by respective tap coefficients, subtracting the predicted echo signal from the outgoing signal to generate a residual signal, and adaptively updating the tap coefficients, comprising:
   detecting a first envelope of the received signal;
   detecting a second envelope of the residual signal; and
   comparing the first envelope with the second envelope.

11. The method of claim 10, further comprising attenuating the residual signal when howling is detected.

12. The method of claim 10, further comprising initializing the tap coefficients when howling is detected.

13. A method of detecting howling in an environment having a first transducer for converting a received signal to acoustic output, a second transducer for converting acoustic input to an outgoing signal, and an adaptive echo canceler for generating a predicted echo signal from the received signal by multiplying samples of the received signal by respective tap coefficients, subtracting the predicted echo signal from the outgoing signal to generate a residual signal, and adaptively updating the tap coefficients, the method including detecting an effect of the predicted echo signal, the method further including:
   detecting an echo attenuation on an echo path from the received signal to the outgoing signal; and
   altering a condition for detection of howling according to the detected echo attenuation, the condition becoming more stringent as the detected echo attenuation increases.

14. The method of claim 13, further including:
   detecting a first envelope of the outgoing signal;
   detecting a second envelope of the residual signal; and
   comparing the first envelope with the second envelope.

15. The method of claim 14, further including detecting howling when the second envelope exceeds the first envelope by a threshold ratio that depends on the detected echo attenuation.

16. The method of claim 15, wherein the threshold ratio increases as the detected echo attenuation increases.

17. The method of claim 13, further including attenuating the residual signal when howling is detected.

18. The method of claim 13, further comprising an initializing circuit for initializing the tap coefficients when howling is detected.

* * * * *